United States Patent [19]

Shimizu et al.

[11] Patent Number: 4,883,521
[45] Date of Patent: Nov. 28, 1989

[54] METHOD FOR THE PREPARATION OF SILICA GLASS

[75] Inventors: Takaaki Shimizu; Syuji Tanaka, both of Niigata, Japan

[73] Assignee: Shin-Etsu Chemical Co., Ltd., Tokyo, Japan

[21] Appl. No.: 249,317

[22] Filed: Sep. 26, 1988

[30] Foreign Application Priority Data

Sep. 30, 1987 [JP] Japan .................................. 62-24685
Sep. 30, 1987 [JP] Japan .................................. 62-246686

[51] Int. Cl.$^4$ .......................................... C03B 37/016
[52] U.S. Cl. .......................................... 65/17; 65/3.11; 65/18.1; 65/18.3; 65/901; 501/12
[58] Field of Search ............... 65/3.11, 17, 18.1, 18.3, 65/60.8, 901; 501/12

[56] References Cited

U.S. PATENT DOCUMENTS

| | | | |
|---|---|---|---|
| 4,324,576 | 4/1982 | Matsuyama et al. | 65/3.11 X |
| 4,397,666 | 8/1983 | Mishima et al. | 65/18.3 |
| 4,417,910 | 11/1983 | Passaret | 65/901 |
| 4,680,046 | 7/1987 | Matsuo et al. | 65/17 |
| 4,680,048 | 7/1987 | Motoki et al. | 65/17 |
| 4,680,049 | 7/1987 | Onorato et al. | 65/18.1 |
| 4,801,318 | 1/1989 | Toki et al. | 65/18.1 |

*Primary Examiner*—Robert L. Lindsay
*Attorney, Agent, or Firm*—Jules E. Goldberg

[57] ABSTRACT

An improved sol-gel method is proposed for the preparation of a transparent silica gel block, in which a deposit of fine silica particles having a controlled particle diameter as prepared by hydrolyzing an alkoxy silane in the presence of ammonia is dispersed in a silica sol solution prepared in an acidic condition and settled therein to form a structure of closest-packing prior to gelation, drying, sintering and vitrification so that silica glass blocks can be obtained with low volume shrinkage from the wet gel in an improved yield without cracks, bubbles and haziness. The improvement can be further enhanced when two separately prepared deposits of silica particles having larger and smaller particle diameters are dispersed as combined in the silica sol solution, especially, when the particle diameter in one deposit is not exceeding 22.5% of that in the other deposit.

11 Claims, 2 Drawing Sheets

METHOD FOR THE PREPARATION OF SILICA GLASS

BACKGROUND OF THE INVENTION

The present invention relates to a method for the preparation of silica glass or, more particularly, relates to an efficient and inexpensive method for the preparation of silica glass by the so-called sol-gel method in which a silica sol solution containing silica particles is concentrated to have the silica particles settled to form a structure of closest packing followed by elevation of the temperature to convert the sol into a gel, drying the silica gel and sintering and vitrification of the dried silica gel into silica glass.

Synthetic silica glass of high purity is a promising material having applications in the optical industry and optocommunication and the demand therefor is rapidly increasing in recent years. Several methods are known in the prior art for the preparation of silica glass including the method of pyrolytic or high-temperature synthesis, in which a silicon compound having vaporizability is subjected to flame hydrolysis in an oxyhydrogen flame or to oxidative decomposition in a plasma flame to deposit silica particles on a target followed by fusion and vitrification of the thus deposited silica particles, and the method of low-temperature synthesis or the so-called sol-gel method, in which a solution of an alkoxy silane in an alcohol or an aqueous solution of an inorganic silicate such as water glass is converted into a gel and the thus formed silica gel is heat-treated and vitrified into transparent silica glass.

These known methods of prior art have several problems and disadvantages. For example, the former method of high-temperature synthesis is disadvantages in respect of the large energy consumption in the form of the heat of combustion of the oxyhydrogen flames or in the form of an electric power for the generation of the plasma as well as the heat required in the step of vitrification of the deposited silica particles at a temperature of about 2000° C. and the low take-up of the dopant added to the silica deposit and low controllability of the dopant concentration which is essential for the control of the refractive index of the silica glass due to the vaporization loss of the dopant in the course of the high temperature treatment for sintering and vitrification of the silica particles as well as the lengthy procedure of the process leading to a great economical disadvantage.

The latter method of low temperature synthesis is classified into three types. In the first type (A) of the method, an alkoxy silane compound is first hydrolyzed in an alcoholic solution in the presence of an acidic catalyst such as hydrochloric acid or a basic catalyst such as ammonia followed by heating to convert the reaction mixture into a wet gel which is then dried, sintered and vitrified into transparent silica glass (see, for example, Japanese Patent Publication No. 59-9497). In the second type (B) of the method disclosed in Journal of American Ceramic Society, volume 66, No. 10, page 683 (1983), a suspension of very finely divided silica particles having a particle diameter of 1 μm or smaller in a suitable dispersion medium such as water is converted into a wet gel by adding an acidic or basic gelation catalyst followed by drying, sintering and vitrification into transparent silica glass or, alternatively, the dispersion medium of the above mentioned dispersion of the fine silica particles is evaporated to dryness to form a dry agglomerate of the silica particles which is then sintered and vitrified into transparent silica glass. In the third type (C) of the method of low temperature synthesis, an alkoxy silane compound is hydrolyzed in the presence of an acidic or basic catalyst to form a uniform sol which is admixed with a separately prepared suspension of fine silica particles having a diameter of 1 μm or smaller in a dispersion medium such as water or, alternatively, the sol of the hydrolysis product is admixed with the fine silica particles as such to prepare a silica sol solution containing the silica particles dispersed therein followed by control of the pH and temperature to cause gelation thereof into a wet gel which is dried, sintered and vitrified into transparent silica glass (see, for example, Japanese Patent Kokai No. 61-91033).

The above described methods of low temperature synthesis are advantageous over the method of high temperature synthesis from the standpoint of energy saving since the vitrification can be performed at a temperature rarely exceeding 1000° to 1500° C. In addition, various kinds of dopants can be introduced into the silica glass by the cohydrolysis of a mixture of an alkoxide of the dopant element and an alkoxy silane compound or by adding a powdery oxide of the dopant element to the alkoxy silane compound subjected to hydrolysis so that the dopant take-up can be almost 100% without loss thereof by vaporization. Further, the step of gelation of the sol into a gel can be performed in a vessel of any desired form so that the silica glass after vitrification may also have a desired form and the costs for the subsequent working of shaping, cutting, grinding and the like can greatly be saved to give an economical advantage.

The methods of low temperature synthesis, however, also cannot be free from several problems. For example, the method of the first type is not suitable for manufacturing a large block of silica glass since the mass of the gel is liable to be cracked or to cause foaming in the course of drying of the gel and subsequent sintering. The method of the second type is also not suitable for manufacturing a large block of silica glass since the mass of the gel is liable to be cracked in the course of drying although it is free from the problem of foaming in addition to the economical disadvantage due to the relatively high temperature of 1500° C. or higher required for the vitrification of the dried gel. The method of the third type is defective as a method for obtaining transparent silica glass with good reproducibility and high yield because the mass of the gel under vitrification is sometimes subject to foaming resulting in products of opaque silica glass.

SUMMARY OF THE INVENTION

The present invention accordingly has an object to provide a novel and advantageous method for the preparation of transparent silica glass by the sol-gel method in a high yield and with decreased energy consumption.

The method of the invention for the preparation of transparent silica glass comprises the steps of:

(a) hydrolyzing a first alkoxy silane compound in the presence of a basic catalyst to prepare a dispersion containing spherical fine particles of silica;

(b) removing the basic catalyst from the dispersion by distillation so as to bring the pH of the dispersion to 8 or below;

(c) settling the silica particles in the dispersion;

(d) discarding the supernatant from the dispersion to obtain a deposit of the silica particles;

(e) dispersing the thus deposited silica particles in a silica sol solution of a hydrolyzate of a second alkoxy silane compound obtained by the hydrolysis in the presence of an acidic catalyst to prepare a dispersion of the silica particles;

(f) adjusting the pH of the dispersion to have a value of 2 to 6;

(g) settling the silica particles in the dispersion;

(h) discarding the supernatant from the dispersion to obtain a deposit of the silica particles;

(i) heating the deposit of the silica particles to obtain a wet gel thereof; and (j) drying, sintering and vitrifying the wet gel of silica particles to give transparent silica glass.

The above described inventive method can be further improved by undertaking the steps (a) to (d) in two separate series so as to obtain two deposits of silica particles, in each of which the silica particles have a different particle diameter than that in the other deposit, and the silica particles of the two deposits are used as combined in the step (e). It is preferable in this case that the silica particles in one deposit have a particle diameter not exceeding 22.5% of the particle diameter of the silica particles in the other deposit.

DETAILED DESCRIPTION OF THE PREFERRED EMBODIMENTS

Figure 1:
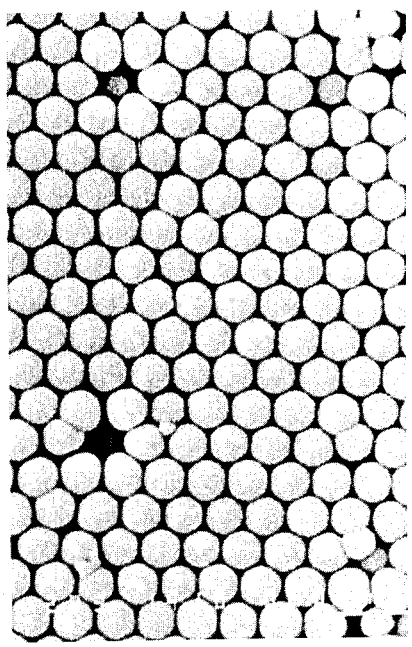
FIG. 1 is an electron microscopic photograph of the silica particle deposit obtained in Example 1 showing the closest-packing structure and FIG. 2 is a similar photograph of the silica particle deposit obtained in Comparative Example showing a random arrangement of the silica particles.

The inventors have conducted investigations on the sol-gel method of the type (C) described above and summarized the problems in this method as follows. Namely, the wet gel of the silica particles obtained in this method has a low packing density of the particles with poor mechanical strengths. In the course of the process of sintering and vitrification, a reaction of dehydration condensation takes place between the silanolic hydroxy groups on the surface of the dried gel having a porous structure so that the water as the reaction product of the condensation reaction is confined within the glass and expansion of the water vapor in the subsequent step of heating results in foaming of the glass. Further, the dry gel is formed of fine silica particles enveloped by the phase of silica sol which is sintered and vitrified at a lower temperature than the silica particles to be left in the glass as opaque spots.

The investigations undertaken by the inventors to solve the above described problems have lead to a conclusion that, when the hydrolysis of an alkoxy silane compound is performed in the presence of a basic catalyst such as ammonia, the pores of the thus formed fine silica particles have a relatively large diameter so that the pores may serve as a duct for the escape of the water vapor produced in the course of sintering and vitrification of the dry gel. When the density thereof in number is small, therefore, the reinforcing effect is decreased and dissipation of water vapor is disturbed to cause foaming.

When the density of the silica particles in number is small, the volume fraction of the opaque portion is increased by the gelation of the silica sol enclosing the silica particles. When the density thereof in number is large, on the other hand, the temperature of sintering and vitrification is more definite and complete vitrification of the dry gel can be achieved at a lower temperature to give uniform and fully transparent silica glass. Accordingly, it would be a preferable condition that the density of the silica particles in number prior to gelation should be increased as far as possible.

In principle, the mass of silica particles has the largest density in number when the particles take the so-called closest-packing structure assuming that the particles have a uniform diameter. The silica particles obtained by the hydrolysis of an alkoxy silane compound have a uniform diameter and the experimental results indicated that the closest-packing structure of the silica particles could be obtained when the silica particles dispersed in the hydrolysis medium are settled by centrifugation or under gravity.

In the inventive method, namely, the silica particles deposited in the silica sol solution take a structure of closest packing so that the volume shrinkage of the wet gel obtained by the gelation of the deposit followed by drying, sintering and vitrification can be as small as 60% or smaller which is much smaller than 80% or larger values in the conventional methods so that the silica glass can be obtained in an increased yield without cracks due to the decrease in the stress by shrinkage. The silica glass thus obtained is highly transparent without haziness and foaming as a result of easy dissipation of water vapor through the pores of the silica particles.

Journal of Colloid and Interface Science, volume 26, page 62 (1968) teaches a method for the preparation of monodisperse fine silica particles, i.e. silica particles having a uniform particle diameter. According to the teaching there, the diameter of silica particles can be controlled within a range of 0.01 to 2.0 μm when an alkoxy silane compound is hydrolyzed at a definite temperature in a hydrolysis medium composed of water and an organic solvent in the presence of ammonia by appropriately selecting the temperature and the amounts of the respective constituents of the reaction mixture. For example, the particle diameter is increased or decreased with the increase or decrease, respectively, in the amount of ammonia as the hydrolysis catalyst. Water also has an effect on the particle diameter, which is the largest largest at a certain concentration of water, decreases by increasing or decreasing the concentration of water. The organic solvent has an effect of decreasing the diameter of the silica particles. Increase in the temperature also has an effect of decreasing the diameter of the silica particles. The diameter of the silica particles should preferably be in the range from 0.1 to 2.0 μm since finer diameters of the silica particles can be obtained only by taking a longer time to obtain the desired closest-packing structure.

The starting material of silica used in the inventive method is an alkoxy silane compound represented by the general formula $Si(OR)_4$, in which R is an alkyl group having 1 to 4 carbon atoms. When the alkyl group denoted by R is higher than butyl, the sol of the hydrolysis product may be more strongly hydrophobic so that the reaction mixture of the hydrolysis is separated into two layers to decrease the uniformity of the sol. Examples of suitable alkoxy silane compounds include tetramethoxy silane, tetraethoxy silane, tetrapropoxy silane, tetrabutoxy silane, methoxy triethoxy silane, dimethoxy diethoxy silane, trimethoxy ethoxy silane and the like, of which tetramethoxy silane and tetraethoxy silane are preferred in respect of the availability and inexpensiveness.

When the silica glass obtained according to the inventive method is used as a material of optical fibers used in optocommunication, it is usual that the silica glass is imparted with a modified refractive index by the addition of a dopant. The elements suitable as a dopant in the silica glass include phosphorus, titanium, aluminum, boron, germanium, zirconium, neodymium and the like and the dopants are added to the alkoxy silane compound in the form of an alkoxide such as $PO(OR)_3$, $Ti(OR)_4$, $Al(OR)_3$, $B(OR)_3$, $Ge(OR)_4$, $Zr(OR)_4$, $Nd(OR)_3$ and the like, in which R is an alkyl group having 1 to 4 carbon atoms. These alkoxides of the dopant elements added to the alkoxy silane compound are cohydrolyzed and processed into finished silica glass according to the inventive method. Since the inventive method involves no step carried out at a particularly high temperature, the dopant added to the starting alkoxy silane compound can be retained almost in a 100% yield in the finished silica glass without loss by dissipation at a high temperature.

Following is a more detailed description of the inventive method step by step.

In step (a) of the inventive method, an alkoxy silane compound or a mixture thereof with a compound of a dopant element is hydrolyzed in the presence of a basic catalyst which is preferably ammonia used in the form of an ammonia water. The medium for the hydrolysis is prepared by mixing 0.1 to 10 moles of ammonia in the form of an ammonia water, 2 to 20 moles of water and 5 to 100 moles of an alcohol having 1 to 4 carbon atoms in a molecule such as methyl, ethyl, propyl and butyl alochols as an organic solvent having miscibility with the alkoxy silane compound. The hydrolysis reaction is performed by adding 1 mole of the alkoxy silane compound, optionally, diluted with an organic solvent dropwise to the hydrolysis medium with agitation at a temperature in the range from 0° to 50° C. under normal or a superatmospheric pressure. It is important that agitation of the reaction mixture is performed vigorously by using a stirrer equipment having a high efficiency of shearing force in order to prevent agglomeration of the silica particles formed by the hydrolysis.

In the next step (b), the thus obtained suspension or dispersion of the silica particles formed by the hydrolysis of the alkoxy silane compound is subjected to distillation to remove the ammonia as the catalyst together with a part of water and the alcohol. The distillation should be performed to such an extent that the resultant suspension of the silica particles has a pH not exceeding 8. When the distillation is performed only insufficiently so that the resultant suspension has a pH higher than 8, gelation would take place instantaneously when the suspension is mixed subsequently with a uniform silica sol solution prepared by the hydrolysis in an acidic condition. Along with proceeding of the distillation, the content of the silica particles in the suspension is gradually increased by the removal of a part of water and alcohol in the hydrolysis medium. When the pH of the suspension is still higher than 8 even with the content of the silica in the suspension having reached 50% by weight by the removal of water and alcohol from the medium, it is preferable that distillation is continued by adding an appropriate amount of water to the suspension in order to keep the silica content therein not to exceed 50% by weight because an undue increase in the silica content in the suspension may cause agglomeration or gelation of the silica particles.

The silica particles thus obtained have a spherical configuration and are outstandingly monodisperse with a uniform particle diameter. When the suspension of the silica particles is kept standing still in step (c), the silica particles are settled in the suspension on the bottom of the vessel. It is optional that settling of the silica particles is accelerated by centrifugation according to need since settling of the silica particles may take an unduly long time when the diameter of the particles is smaller than, for example, 0.2 $\mu$m.

When settling of the silica particles in the dispersion has come to completion, the supernatant is discarded in step (d) so as to obtain a deposit of the silica particles.

In the step (e) of the inventive method, the above obtained deposit of silica particles is re-dispersed in a silica sol solution which is prepared separately by the hydrolysis of an alkoxy silane compound in an acidic condition. The hydrolysis reaction in an acidic condition is performed by preparing a hydrolysis medium by mixing $1 \times 10^{-4}$ to $1 \times 10^{-3}$ mole of an acid which may be an inorganic acid such as hydrochloric, sulfuric and nitric acids or an organic acid such as acetic acid, 2 to 20 moles of water and, optionally, an organic solvent and adding 1 mole of the alkoxy silane compound with optional admixture of a compound of the dopant element, if necessary, as diluted with an organic solvent such as alcohols dropwise to the hydrolysis medium with agitation at a temperature to 0° to 50° C. under normal or superatmospheric pressure. It is sometimes preferable that the thus obtained silica sol solution is concentrated to have a silica content of 20% to 50% by weight by distillation to remove a part of water and the organic solvent prior to admixture with the deposit of the silica particles obtained in step (d). It should be noted that the distillation of the silica sol solution to remove a part of water and the organic solvent is performed under reduced pressure at a temperature as low as possible in order to minimize dissipation of the acid catalyst out of the solution since loss of the acid catalyst in the distillation at high temperatures naturally causes an increase in the pH of the solution approaching neutrality eventually resulting in gelation of the sol solution at an elevated temperature.

The thus prepared silica sol solution having an increased silica concentration is admixed with the deposit of the fine silica particles obtained in step (d) to re-disperse the particles therein under agitation. It is essential that the thus prepared dispersion of the re-dispersed silica particles has a pH in the range from 2 to 6. When the dispersion as prepared has a value of pH outside the above mentioned range, the dispersion is admixed in step (f) with a pH controlling agent which may be an acid such as hydrochloric and sulfuric acids or an alkali such as an ammonia water. The procedure above described is performed preferably at a low temperature in the range from 0° to 20° C. in order to avoid premature gelation of the mixture. The blending amount of the silica particle deposit and the silica sol solution is also an important parameter in order to obtain a satisfactory result. It is usual that the eight ratio of the silixa particle deposit to the silica sol solution is in the range from 2 to 10 each calculated as the silica content.

In step (g) following the above described step (f), the redispersed silica particles in the dispersion are settled again in the dispersion medium at a temperature in the range from 0° to 20° C. The particles can be settled either by standing the dispersion still or by subjecting the dispersion to centrifugation. In either way, the dispersion should be kept preferably at a temperature in the above mentioned range in order to avoid premature gelation before the silica particles take a structure of closest packing.

When the silica particles have been fully settled in the medium, the supernatant is discarded in step (h) to give a deposit of the silica particles.

The deposit of the silica particles obtained in step (h) is then subjected to gelation into a wet gel in step (i). Gelation can be effected by heating the deposit of the silica particles at a temperature, preferably, in the range from 30° to 60° C. When the temperature of the heat treatment is too high, drying of the silica particle deposit may proceed concurrently with gelation leading to eventual crack fromation in the dried mass although the reaction of gelation can proceed at a higher velocity when the heating temperature is higher.

The wet gel of the silica particles is then dried, sintered and vitrified in step (j). It is important that drying of the wet gel is performed at a controlled velocity to gradually decrease the amounts of water and the alcoholic solvent contained in the wet gel because the mass of the gel during drying may have cracks when the velocity of drying of the wet gel is too high. In this regard, a preferable pro-cess of drying is performed in a semi-closed vessel having an opening of 0.1% to 5% relative to the surface area of the wet gel of silica contained in the vesselat a temperature in the range from 50° to 70° C. until the weight of the wet gel is reduced to about 15 to 35% of the starting weight.

The dried gel of the silica particles is then subjected to a heat treatment to cause sintering and vitrification by gradual or stepwise increase of the temperature from room temperature up to about 1100° C. to effect desorption of the water adsorbed on the surface in the temperature range from 100° to 300° C., oxidation and decarburization of the residual organic matter in an oxygen-containing atmosphere in the temperature range from 300° to 500° C. and dehydration condensation between silanolic hydroxy groups on the surface in the temperature range from 500° to 1100° C. In order to avoid formation of cracks in the course of these processes, the rate of temperature elevation should preferably be in the range from 10° to 100° C./hour. It is an advantageous way to conduct the heat treatment in an atmosphere of helium gas having a high thermal conductivity by which the temperature distribution can be more uniform. It is optional with an object to reduce the hydroxy content in the silica glass that the above mentioned step of sintering at 700° to 900° C. is performed in an atmosphere containing a chlorinating agent such as chlorine $Cl_2$, thionyl chloride $SOCl_2$ and the like followed by an oxidative dechlorination treatment to conduct the subsequent sintering at 900° to 1100° C. in the presence of an oxidizing agent such as oxygen gas.

Vitrification of the sintered silica is performed by increasing the temperature stepwise from 1100° C. to 1400° C. to effect closure of the pores in a temperature range of 1100° C. to 1200° C. and vitrification in a temperature range of 1200° C. to 1400° C.

According to the above described method of the present invention for the preparation of silica glass from an alkoxy silane compound as the starting material, the density of the spherical silica particles in number is increased in the silica sol solution so that the deposit of the silica particles has a structure of the closest packing and then the deposit of the silica particles is subjected to gelation into a wet gel which is dried, sintered and vitrified into transparent silica glass. Advantageously, the volume shrinkage from the wet gel to the final product is as small as 60% or less without being accompanied by crack formation or foaming so that the desired transparent silica glass can be produced at low costs and in a good yield.

The above described advantages of the inventive method can be further increased when a modification is effected in the steps of the above described method. Namely, the steps (a) to (d) of the inventive method is conducted in two separate series so as to obtain two deposits of the silica particles each having a different particle diameter than that in the other and the step (e) is performed by dispersing the two deposits of the silica particles as combined in a silica sol solution.

The above mentioned use of two deposits of silica particles having different particle diameters is based on the discovery that, when the two particle diameters satisfy a certain relationship, the silica particles having the smaller particle diameter can fill the interstices in the closest-packing structure formed by the silica particles having the larger particle diameter so that the packing density of the deposit of the silica particles obtained in the step (h) can be increased so much.

Assuming that the diameter of the spherical silica particles having the larger particle diameter is D and the diameter of the silica particles having the smaller particle diameter is d, the smaller particles can just fill the interstices of the larger particles forming the closest-packing structure when d satisfies the following mathematical equation:

$$d/D = 3/2 \cdot \sin[90 - \sin^{-1}(1/\sqrt{3})] - 1$$

or $$d/D = 0.225.$$

When the silica particles in a first deposit have a particle diameter of 0.200 μm forming a closest-packing structure, for example, a silica particle having a smaller diameter of $(0.200 \times 0.225 =)$ 0.045 μm can just fit an interstice in the closest-packing structure of the larger silica particles to increase the overall packing density so much. It is of course that the interstices of the larger silica particles can be filled also by smaller silica particles having a diameter smaller than 22.5% of the diameter of the larger particles equally to give the effect of increasing the packing density. The diameter of the silica particles can be controlled by suitably selecting the conditions in the procedure of preparation according to the teaching in Journal of Colloid and Interface Science, volume 26, page 62 (1968). The blending proportion of the two silica particle deposits is selected such that the weight ratio of the silica particles in the first deposit having the larger particle diameter to the silica particles in the second deposit having the having the smaller particle diameter is in the range from 10 to 15. Excepting for the combined use of two silica particle deposits having different particle diameters, the other steps of the inventive method can be performed in just the same manner as described already.

In the following, the method of the present invention is described in more detail by way of examples. In the description below, the term of "volume shrinkage, %" is a value defined by the following equation:

volume shrinkage, $\% = (L_W^3 - L_G^3)/L_W^3 \times 100$, in which $L_W$ is a dimension of a block of the wet gel and $L_G$ is the corresponding dimension of the silica glass block after drying, sintering and vitrification of the wet gel.

EXAMPLE 1.

Into a flask equipped with a dropping funnel, thermometer and turbine-blade stirrer were introduced 321 g of water, 4950 ml of anhydrous ethyl alcohol and 297 ml of concentrated ammonia water containing 28% by weight of ammonia to form a mixture as a hydrolysis medium. The mixture in the flask was kept at a temperature of 10° C. under vigorous agitation and 926 g of tetraethoxy silane were added thereto dropwise followed by further continued agitation for 2 hours to effect the hydrolysis of the tetraethoxy silane. Thereafter, the mixture was subjected to distillation at a temperature of 50° to 60° C. under reduced pressure to remove ammonia and a part of water and ethyl alcohol with portion-wise addition of water to compensate for the decreased volume of water until the mixture, which was a suspension of fine silica particles in a content of 30% by weight, had a pH of 6.5. The suspension was then centrifuged for 20 minutes at a velocity of 4000 rpm so that the silica particles were precipitated to give a deposit by discarding the supernatant. The silica particles had a uniform particle diameter of about 0.2 μm.

Separately, a mixture composed of 260 g of tetraethoxy silane and 103 ml of anhydrous ethyl alcohol was prepared and kept at a temperature of 25° C. and 90 g of a 0.02N hydrochloric acid were added thereto under vigorous agitation followed by further continued agitation for 2 hours to effect hydrolysis of the tetraethoxy silane. The mixture was then subjected to distillation under reduced pressure at 40° to 50° C. to remove a part of water and ethyl alcohol so that a silica sol solution was obtained of which the content of silica was 30% by weight.

The thus prepared silica sol solution was added to the deposit of the silica particles which were dispersed in the silica sol solution by vigorous agitation. The dispersion of the silica particles was chilled at 5° C. and admixed with a small volume of ammonia water under vigorous agitation to have a pH adjusted to 5.0. The dispersion was poured into a vessel of 160 mm by 160 mm wide and 50 mm deep made of a fluorocarbon resin and kept standing for 24 hours at a temperature of 5° to 7° C. so that the silica particles were settled on the bottom of the vessel. After discarding the supernatant by syphoning, the silica particle deposit was examined using an electron microscope (Model Superprobe Microanalyzer, manufactured by Nippon Denshi Co.) to find that a closest-packing structure was formed by the ordered arrangement of the silica particles (see FIG. 1).

Thereafter, the vessel containing the silica deposit was provided with a cover having perforations of each 1 mm diameter to make an open area of 0.3% and heated at 30° C. for 8 hours in a thermostat so as to cause gelation of the silica deposit into a block of wet gel having the same dimensions as the vessel. Ten blocks of wet gel prepared in this manner were transferred to a thermostat running at 60° C. and dried by keeping there for 16 days to find crack formation in none of the ten blocks.

These dried silica gel blocks were then sintered and vitrified by heating in a muffle furnace according to the following schedule of temperature elevation. Thus, the temperature was increased from room temperature to 300° C. at a rate of 30° C./hour and the silica gel blocks were kept at this temperature for 5 hours followed by an increase of the temperature up to 700° C. at a rate of 30° C./hour to effect decarburization. The blocks were kept at 700° C. for 2 hours to effect dehydration condensation while the pores in the silica gel were still in an open condition. Thereafter, the air inside the furnace was replaced with helium and the temperature was increased from 700° C. to 1100° C. at a rate of 30° C./hour. The blocks were kept at this temperature for 10 hours so as to close the pores. Further, the blocks were vitrified by increasing the temperature up to 1300° C. at a rate of 30° C./hour and by keeping this temperature for 5 hours. The thus obtained transparent blocks of silica glass each had dimensions of 120 mm by 120 mm by 10 mm. The volume shrinkage was 58% from the wet gel to the transparent silica glass.

EXAMPLE 2

A deposit of silica particles having a diameter of about 0.2 μm was prepared in substantially the same manner as in Example 1 excepting the use of a mixture of 880 g of tetraethopxy silane and 31 g of trimethyl phosphate in place of 926 g of tetraethoxy silane used in the hydrolysis in the presence of the ammonia catalyst.

Similarly, a silica sol solution containing 30% by weight of silica was prepared in substantially the same manner as in Example 1 excepting the use of a mixture of 247 g of tetraethopxy silane and 8.8 g of trimethyl phosphate in place of 260 g of tetraethoxy silane used in the hydrolysis in the presence of the acidic catalyst.

The deposit of silica particles and the silica sol solution prepared in the above described manner were used for the preparation of silica glass blocks in substantially the same manner as in Example 1. The volume shrinkage was 58% from the wet gel to the transparent silica glass in each of the 10 silica glass blocks thus prepared. Chemical analysis of these silica glass blocks indicated that the phosphorus constituent added as trimethyl phosphate was fixed in the silica glass in a yield of almost 100%.

COMPARATIVE EXAMPLE

A hydrolysis medium was prepared by introducing 209 g of water, 3228 ml of anhydrous ethyl alcohol and 194 ml of a concentrated ammonia water containing 28% by weight of ammonia into a flask and 604 g of tetraethoxy silane were added thereto dropwise. The mixture was agitated for 2 hours to effect hydrolysis of tetraethoxy silane followed by distillation under reduced pressure to remove ammonia and a part of water and ethyl alcohol with portionwise addition of water until the pH of the mixture had reached 6.5. The thus obtained suspension contained 30% by weight of silica particles having an average particle diameter of 0.16 μm.

Figure 2:
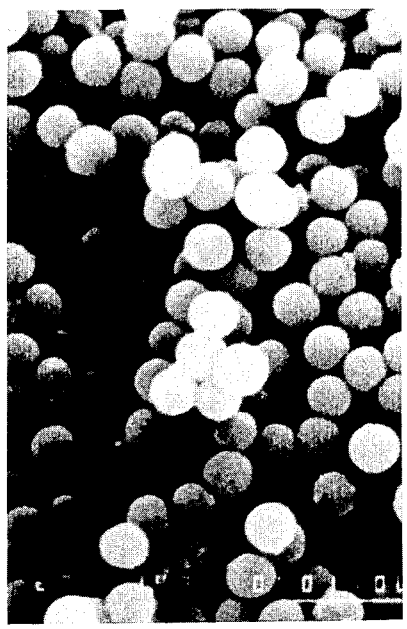

Separately, 494 g of tetraethoxy silane were admixed with 196 ml of anhydrous ethyl alcohol and 171 g of a 0.02N hydrochloric acid and the mixture was agitated for 2 hours to effect hydrolysis of the tetraethoxy silane. The thus obtained silica sol solution was blended with the suspension of silica particles obtained above and the pH of the mixture was adjusted to 5.0 by the addition of a small volume of ammonia water. The electron microscopic examination of the thus prepared silica particle suspension indicated that the silica particles were in an irregular arrangement far from the closest-packing structure as is shown in FIG. 2.

The suspension of silica particles was poured into a vessel of 250 mm by 250 mm wide and 50 mm deep made of a fluorocarbon resin and converted into a block of wet gel by heating at 30° C. for 8 hours in the vessel provided with a perforated cover of 0.3% open area with perforations of 1 mm diameter. Ten blocks of wet gel prepared in this manner were transferred to a thermostat running at 60° C. and dried by keeping there for 16 days to find that cracks were formed in two of these ten dried silica gel blocks.

Eight dried silica gel blocks free from cracks were subjected to sintering and vitrification in substantially the same manner as in Example 1. The results were that four of eight blocks could be converted each into a transparent silica glass block of 120 mm by 120 mm by 10 mm dimensions with a volume shrinkage of 89% from the wet gel blocks to the transparent silica glass blocks. The remainder four of the blocks were unacceptable as a product of silica glass blocks because two were opaque, one contained bubbles and cracks were found in one.

EXAMPLE 3.

A suspension containing 30% by weight of silica particles of 0.2 μm particle diameter and having a pH of 6.5, which is referred to as the suspension A hereinbelow, was prepared in just the same manner as in Example 1.

Similarly, another suspension of silica particles, which is referred to as the suspension B hereinbelow, containing 30% by weight of silica particles of 0.045 μm particle diameter and having a pH of 6.5 was prepared in the following manner. Thus, a mixture composed of 124 g of water, 404 ml of methyl alcohol and 36.5 ml of concentrated 28% ammonia water was vigorously agitated in a flask at 37.5° C. and a mixture of 51.9 g of tetramethoxy silane and 68 ml of methyl alcohol was added thereto dropwise over 1 hour to effect hydrolysis of the silane followed by removal of the ammonia and a part of water and methyl alcohol in the same manner as in the preparation of the suspension A.

Whole volumes of the suspensions A and B were blended together and the mixed suspension was subjected to centrifugation for 40 minutes at a velocity of 15,000 rpm to effect settling of the silica particles. The supernatant was discarded to give a deposit of silica particles.

Separately, a silica sol solution containing 30% by weight of silica was prepared in just the same manner as in Example 1. The silica sol solution was added to the above prepared deposit of silica particles which were dispersed in the solution by vigorous agitation. Thereafter, the dispersion was chilled at about 7° C. on an ice water bath and admixed with a small amount of a 2N ammonia water to have a pH adjusted to 5.0.

Using the thus prepared suspension of silica particles, ten transparent silica glass blocks each having dimensions of 122 mm by 122 mm by 10.5 mm were prepared in just the same manner as in Example 1. Cracks and other defects were found in none of these ten silica glass blocks. The volume shrinkage was 56% from the wet gel to the transparent silica glass blocks.

EXAMPLE 4

Suspensions of silica particles each having a particle diameter of 0.2 μm or 0.045 μm and doped with phosphorus were prepared in the same manner as in the preparation of the suspensions A and B in Example 3 excepting replaement of 926 g of tetraethoxy silane in the preparation of the suspension A with a mixture of 880 g of tetraethoxy silane and 31 g of trimethyl phosphate and 51.9 g of tetraethoxy silane in the preparation of the suspension B with a mixture of 49.2 g of tetraethoxy silane and 2.4 g of trimethyl phosphate.

Separately, a silica sol solution was prepared in the same manner as in Example 3 excepting replacement of 260 g of tetraethoxy silane with a mixture of 247 g of tetraethoxy silane and 8.8 g of trimethyl phosphate.

Ten transparent blocks of phosphorus-doped silica glass were prepared in the same manner as in the preceding example by using the above prepared two silica particle suspensions and silica sol solution. Cracks and other defects were found in none of these ten silica glass blocks. The volume shrinkage was 56% from the wet gel to the transparent silica glass blocks. Chemical analysis of these silica glass blocks indicated that the phosphorus constituent added as trimethyl phosphate was fixed in the silica glass in a yield of almost 100%.

What is claimed is:

1. A method for the preparation of transparent silica glass which comprises the successive steps of:
    (a) hydrolyzing an alkoxy silane compound in the presence of a basic catalyst to prepare a dispersion containing spherical particles of silica;
    (b) removing the basic catalyst from the dispersion by distillation so as to bring the pH of the dispersion to 8 or below;
    (c) settling the silica particles in the dispersion;
    (d) discarding the supernatant from the dispersion to obtain a first deposit of the silica particles;
    (e) dispersing the first deposit of silica particles in a silica sol solution of a hydrolyzate of an alkoxy silane compound obtained by the hydrolysis thereof in the presence of an acidic catalyst to prepare a dispersion of the silica particles in the silica sol solution;
    (f) adjusting the pH of the dispersion to have a value of 2 to 6;
    (g) settling the silica particles in the dispersion;
    (h) discarding the supernatant from the dispersion to obtain a sexcond deposit of the silica particles;
    (i) heating the second deposit of the silica particles to obtain a wet gel thereof; and
    (j) drying, sintering and vitrifying the wet gel of silica particles to give a block of transparent silica glass.

2. The method for the preparation of transparent silica glass as claimed in claim 1 wherein the basic catalyst used in step (a) is ammonia.

3. The method for the preparation of transparent silica glass as claimed in claim 1 wherein the alkoxy silane compound is tetraethoxy silane or tetramethoxy silane.

4. The method for the preparation of transparent silica glass as claimed in claim 2 wherein the hydrolysis in step (a) is performed by adding 1 mole of the alkoxy silane compound to a mixture composed of 0.1 to 10 moles of ammonia, 2 to 20 moles of water and 5 to 100 moles of an alcohol at a temperature in the range from 0° to 50° C.

5. The method for the preparation of transparent silica glass as claimed in claim 2 wherein the content of silica in the dispersion after step (b) is 50% by weight or smaller.

6. The method for the preparation of transparent silica glass as claimed in claim 1 wherein the weight ratio of the silica content in the first deposit of silica particles to the silica content in the silica sol solution is in the range from 2 to 10.

7. The method for the preparation of transparent silica glass as claimed in claim 1 wherein the steps (e) to (h) are performed at a temperature in the range from 0° to 20° C.

8. The method for the preparation of transparent silica glass as claimed in claim 1 wherein drying of the wet gel in step (i) is performed in the range from from 50° to 70° C.

9. The method for the preparation of transparent silica glass as claimed in claim 1 wherein the steps (a) to (d) are performed in two separate series to give two deposits of silica particles having different particle diameters each from the other and the two deposits of silica particles are dispersed simultaneously in the silica sol solution in step (e).

10. The method for the preparation of transparent silica glass as claimed in claim 9 wherein the silica particles in one deposit of silica particles have a particle diameter not exceding 22.5% of the particle diameter of the silica particles in the other deposit.

11. The method for the preparation of transparent silica glass as claimed in claim 9 wherein the weight ratio of the silica particles in the deposit of larger particle diameter to the silica particles of the deposit of the smaller particloe diameter is in the range from 10 to 15.

* * * * *